(12) United States Patent
Stevens et al.

(10) Patent No.: US 7,849,476 B2
(45) Date of Patent: Dec. 7, 2010

(54) SYSTEM AND METHOD FOR AUTOMATIC SWITCHING TO INTERACTIVE APPLICATION DURING TELEVISION PROGRAM BREAKS

(75) Inventors: John Herbert Stevens, Martinsville, IN (US); Timothy Joseph Tully, Noblesville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1225 days.

(21) Appl. No.: 10/020,045

(22) Filed: Dec. 13, 2001

(65) Prior Publication Data

US 2003/0115595 A1 Jun. 19, 2003

(51) Int. Cl.
*H04N 7/10* (2006.01)
(52) U.S. Cl. .............................. 725/34; 725/36; 725/61; 709/219; 348/559
(58) Field of Classification Search .................... 725/32, 725/34, 22, 61, 18–19, 58, 78–85, 131–134, 725/139–142, 106–120; 709/217–231; 345/169, 345/553, 556, 173, 716, 717, 722, 901; 348/734
See application file for complete search history.

(56) References Cited

U.S. PATENT DOCUMENTS

| | | | |
|---|---|---|---|
| 4,750,213 A | 6/1988 | Novak | |
| 5,539,920 A * | 7/1996 | Menand et al. | 725/151 |
| 5,692,213 A * | 11/1997 | Goldberg et al. | 715/203 |
| 5,818,440 A * | 10/1998 | Allibhoy et al. | 715/718 |
| 5,835,717 A * | 11/1998 | Karlton et al. | 725/46 |
| 5,973,723 A | 10/1999 | DeLuca | |
| 5,999,689 A | 12/1999 | Iggulden | |
| 6,001,017 A | 12/1999 | Okano et al. | |
| 6,002,443 A | 12/1999 | Iggulden | |
| 6,011,537 A | 1/2000 | Slotznick | |
| 6,171,189 B1 | 1/2001 | Katano et al. | |
| 6,172,712 B1 * | 1/2001 | Beard | 348/552 |
| 6,175,366 B1 | 1/2001 | Watanabe et al. | |
| 6,231,443 B1 | 5/2001 | Asai et al. | |
| 6,267,673 B1 | 7/2001 | Miyamoto et al. | |
| 6,296,570 B1 | 10/2001 | Miyamoto et al. | |
| 6,636,271 B1 * | 10/2003 | Megeid | 348/559 |

(Continued)

FOREIGN PATENT DOCUMENTS

WO WO99/11065 3/1999

(Continued)

OTHER PUBLICATIONS

International Search Report for International Application No. PCT/US02/39401, Mar. 25, 2003.

*Primary Examiner*—Annan Q Shang
(74) *Attorney, Agent, or Firm*—Robert D. Shedd; Harvey D. Fried; Joel M. Fogelson (57) ABSTRACT

A system and method for automatically switching a primary image of a display module from a television program to an interactive application upon detecting the beginning of a commercial break and optionally switching the primary image back to the television program upon detecting or determining the end of the commercial break; wherein the user's progress in executing the interactive application is automatically saved upon return to the television program so that the user can progressively execute the interactive application program during consecutive commercial breaks.

21 Claims, 6 Drawing Sheets

U.S. PATENT DOCUMENTS

| | | |
|---|---|---|
| 6,698,020 B1* | 2/2004 | Zigmond et al. ............... 725/34 |
| 7,069,571 B1* | 6/2006 | Del Sesto et al. .............. 725/14 |
| 7,263,711 B1* | 8/2007 | Estipona ...................... 725/112 |
| 2002/0013950 A1* | 1/2002 | Tomsen ....................... 725/109 |
| 2002/0194593 A1* | 12/2002 | Tsuchida et al. ............... 725/32 |
| 2003/0023970 A1* | 1/2003 | Panabaker ................... 725/32 |
| 2003/0041331 A1* | 2/2003 | Allen et al. .................. 725/106 |
| 2003/0149988 A1* | 8/2003 | Ellis et al. ..................... 725/87 |

FOREIGN PATENT DOCUMENTS

WO  WO00/40025  7/2000

* cited by examiner

SYSTEM AND METHOD FOR AUTOMATIC SWITCHING TO INTERACTIVE APPLICATION DURING TELEVISION PROGRAM BREAKS

BACKGROUND OF THE INVENTION

1. Field of Invention

This invention relates generally to the field of television program receivers and receiving, and specifically to systems and methods which enable identification and replacement of commercial breaks in television programs.

2. Description of Related Art

The television industry has developed and thrived due to the sponsoring of entertainment programming by commercial interests. These commercial interests have resulted in the interruption of entertainment programming with advertising program segments, commonly referred to as commercials. Often, a number of individual commercials are "run" consecutively, interrupting the entertainment programming for an extended period of time. This is what is commonly referred to as a commercial break.

Many television viewers dislike commercial advertising and prefer to spend the time during commercial breaks performing alternative activities. However, because viewers do no want to miss substantial amounts of the entertainment programming they are viewing, and because commercial breaks last only a limited amount of time, viewers often do not want to watch an alternate entertainment program during commercial breaks. As used to describe the present invention, an entertainment program can be a television broadcast program, a DVD program, a VCR program, or any other program in which a person is merely a passive viewer. Watching an alternate entertainment program only during the commercial breaks of the desired entertainment program results in either a majority of the alternate entertainment program being missed or watching only short segments of the alternate entertainment program scattered over a considerable amount of time. Both are undesirable and often result in the viewer being unsatisfied and unentertained by the alternate entertainment program.

Currently, a number of approaches and methods exist for automatically identifying and replacing or editing the commercial break segments of television programming, for example see U.S. Pat. No. 5,973,723, DeLuca; U.S. Pat. No. 4,750,213, Novak; U.S. Pat. No. 6,011,537, 443, Igguldden; U.S. Pat. No. 5,999,689 Iggulddden; and U.S. Pat. No. 5,818, 440, Alibhoy, et al. While these prior art teachings disclose a variety of methods for automatically replacing the display of commercials, all of these prior art methods and apparatus teach replacing the commercial break programming with an alternate entertainment program such as a television broadcast program, a VCR program, a DVD program, or the like. For the reasons discussed above, all of these options are unsatisfactory.

Prior systems for detecting television commercial breaks have been suggested for use in VCR's wherein a videotape recording of a television broadcast can be played on the VCR, and commercials can be identified and skipped. Generally, such VCR systems can identify a certain signal or change in signal included in television broadcasts which signifies the beginning or end of a commercial break. Such VCR systems often output a blank or blue signal during the identified commercial breaks so that a user sees a blank screen during recorded commercial breaks when replaying a recorded broadcast television program. Digital VCR systems such as sold under the trademark TIVO can also be adapted to identify such commercial breaks and skip them during digital playback of user recorded television programs.

Systems which mute the sound or blank the screen during commercial breaks in television programming have also been suggested for television receivers, but such systems have not become readily available because there is no ability to fast forward while watching a program at the time it is being broadcast. Thus, a need still exists to provide viewers who wish to avoid watching commercial breaks with a satisfactory activity that can be performed during commercial breaks without resulting in the viewer missing a substantial amount of the desired television program.

An interactive application is any software program the execution of which is controlled by choices made by the user. Common examples of interactive applications are video games, word processors, spread sheet programs, and internet browser programs. Depending on the type and use of the interactive application involved, interactive application can be used for an almost endless number of purposes, ranging from performing employment related tasks to serving purely recreational purposes.

As a result of this diversity of uses, many people spend considerable amounts of time operating interactive applications by either necessity or pure desire. Moreover, many of these people are the same exact people who wish to avoid watching television commercial breaks. Thus, there is a current need to provide television viewers with a method and apparatus that automatically replaces television commercial breaks with an interactive application.

However, because commercial breaks only last a limited amount of time, and because user's objective in operating an interactive application often takes a longer time to meet than any single commercial break, there is also a need for the user to be able to progressively operate the interactive application (i.e. continue from the user's previous point of operation) during subsequent commercial breaks. Moreover, because a user does not know when a commercial break is going to end, and because many interactive applications require constant user attention and continuous user control, a need exists for automatically pausing (i.e. saving a user's progress in executing) the interactive application when a television commercial break ends.

SUMMARY OF THE INVENTION

These needs and others are met by the present invention which comprises in one aspect system for replacing commercial break portions of television programming with an interactive application. The system detects the beginning of commercial breaks and automatically replaces the commercial breaks with an interactive application operable by the viewer. Preferably, the system automatically returns the viewer's display back to the television program upon detecting or determining the end of the commercial break. Alternatively, the viewer's display will not return back to the television program until the viewer manually elects to do so.

Preferably, the viewer's progress in executing the interactive application is automatically saved at the end of a commercial break or when the viewer elects to return to the television program. The interactive application will then be redisplayed at the beginning of the next commercial break from this saved point of progress, thus allowing the viewer to progressively operate the interactive application during subsequent commercial breaks without missing any substantial portion of the desired television program.

The system comprises an interactive application module capable of executing an interactive application program and generating output data; a television program module that generates a television program signal; an input module for entering user input commands into the interactive application module; a break detection module adapted to detect television commercial breaks in the television program signal and generate a break beginning signal; a display module having a primary display area capable of receiving the television program signal and the interactive application program output data and displaying a primary image corresponding to either the television program signal or the interactive application program output data; and a switching module that switches the primary display image to the interactive application output data upon receiving the break beginning signal so that upon detecting the beginning of a television commercial break the interactive application is automatically presented in the primary display area.

Optionally, the break detection module can be further adapted to generate a break end signal either automatically upon detecting or determining the end of the television commercial break or manually upon a viewer's election, wherein the switching module will switch the primary display image back to the television program signal upon receiving the break end signal so that the television program signal is presented in the primary display area.

The television program module can be a television receiver, a satellite receiver, a VCR, an HDD receiver, or the like. The interactive application program can be a video game program, a word processor program, a spreadsheet program, an internet browser program or the like, and the input module can be a keyboard, mouse, or hand-held controller.

The interactive application module preferably includes a program memory for storing the interactive application program; a central processing unit which executes the interactive application program in accordance to the user input commands; an input command interface for receiving the user input commands from the input module and transferring the user input commands to the central processing unit; a pause memory for storing a user's point of progress in executing the interactive application program; a data output for outputting image and sound data in accordance with the execution of the interactive application program.

Preferably a user's point of progress in executing the interactive application program is automatically stored in the pause memory when the switching module switches the display of the primary display area to the television program, wherein execution of the interactive application program is resumed from the user's stored point of progress in the pause memory when the switching module switches the display of the primary display area back to the interactive application.

The input command interface can be an infrared photosensor and the input module can be one or more hand held remote controllers which emit infrared signals. The interactive application module can have a program memory, where the program memory is typically a CD-ROM, magnetic disc, integrated circuit, and/or hard drive. The system can download interactive application programs from a remote source, for example a remote site on the internet, which stores a multitude of interactive application programs to local memory in, for example a game module or personal computer. The input module can be used to control the selection and downloading of specific programs from the remote source.

The system can further include a means to deactivate the switching module so that the television program signal or the interactive application output data can be permanently displayed as the primary image.

In another embodiment, the invention is a method for executing an interactive application program during television commercial breaks. The inventive method comprises the steps of: providing a television program module which generates a television program signal; providing an interactive application module adapted to receive user input commands and generate output data according to an interactive application program; providing a break detection module to detect the beginning of television commercial breaks in the television program signal; and presenting the television program in a primary display area of a display module until the beginning of a television commercial break is detected and then presenting the interactive application in the primary display area.

Optionally, the break detection module can also detect the end of television commercial breaks, thus allowing the interactive application to be presented in the primary display area until the end of the television commercial break is detected and then presenting the television program in the primary display area.

Preferably, in practicing this method of invention the interactive application module comprises a program memory for storing the interactive application program, a central processing unit which executes the interactive application program in accordance to the user input commands, an input command interface for receiving the user input commands from an input module and transferring the user input commands to the central processing unit, a pause memory for storing a user's point of progress in executing the interactive application program, and a data output means for outputting image and sound data in accordance with the execution of the interactive application program.

Also preferably, the method of invention further comprises the step of automatically storing a user's point of progress in executing the interactive application program in the pause memory when the television program is presented in the primary display area, wherein execution of the interactive application program is resumed from the user's stored point of progress in the pause memory when the interactive application is presented in the primary display area.

Optionally, the interactive application programs can be downloaded to and stored locally in the program memory. Moreover, the display module is a television or computer monitor with picture-in-picture capabilities having a secondary display area in addition to a primary display area, wherein the television program is presented in the primary display area and the interactive application displayed in the secondary display area until a commercial break is detected, wherein upon detection of the beginning of a commercial break the interactive application is presented in the primary display area and the television program is presented in the secondary display area until the end of the commercial break is detected, whereupon detection of the end of the commercial break the television program is presented in the primary display area and the interactive application is displayed in the secondary display area.

DETAILED DESCRIPTION

Figure 1:
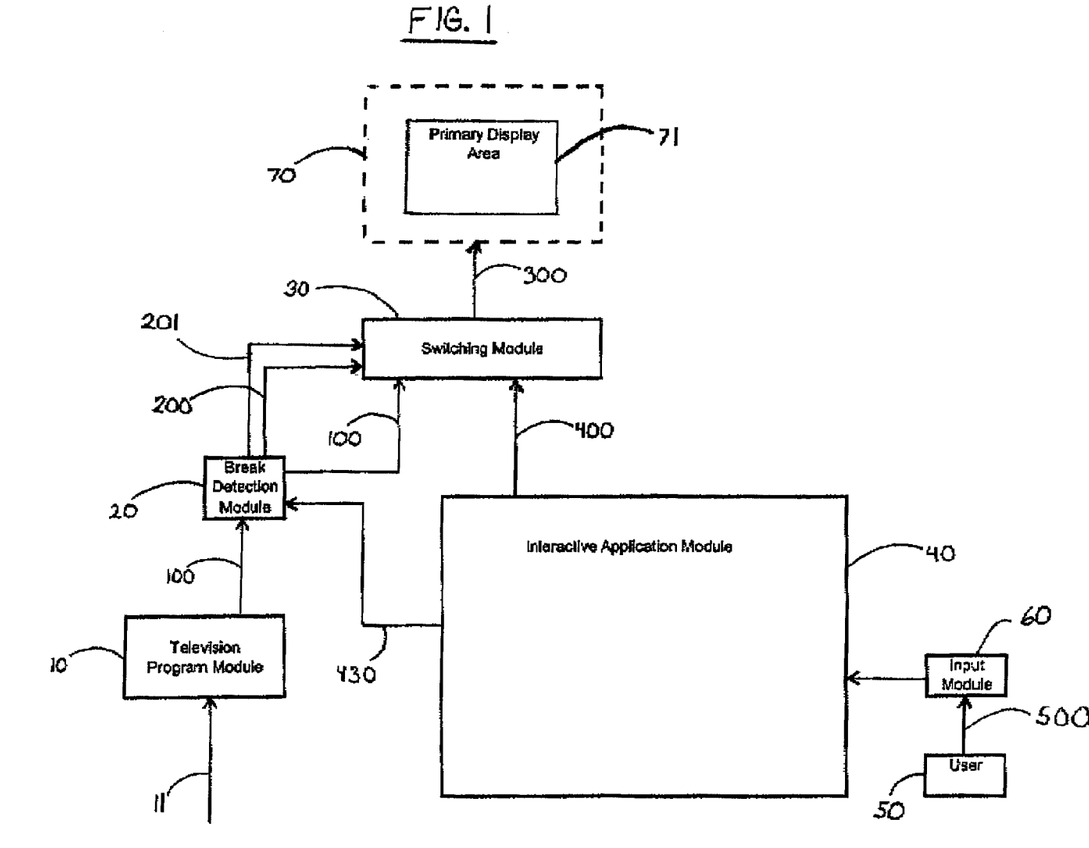
FIG. 1 is a block diagram of an embodiment of a system for detecting and automatically switching to an interactive application during television commercial breaks operating in accordance with the present invention.

FIG. 1 shows a block diagram of a system for detecting and automatically switching to an interactive application during television commercial breaks operating in accordance with the present invention comprising television program module 10, break detection module 20, switching module 30, interactive application module 40, input module 60, and display module 70. In operating this system according to the present invention, television program module 10 outputs television program signal 100 which has visual and/or audio components. Television program module 10 can be a television receiver, a satellite receiver, a VCR, a DVD or CD player, or an HDD receiver. When television program module 10 is a television receiver, a satellite receiver, or an HDD receiver, television program module 10 receives television signal 11 via a cable network, a satellite network, or a ground based antenna and outputs television signal 11 as television program signal 100. Alternatively, when television program module 10 is a VCR, DVD player, or other device capable of playing back recorded television signal 11, television program signal 100 is generated from within television program module 10 by playing a VCR cassette, a CD or DVD, a magnetic disk, or other device that contains pre-recorded television programming. Television program module 10 transmits television program signal 100 to break detection module 20 which in turn transmits television program signal 100 to switching module 30.

Interactive application module 40 outputs interactive application output data 400 which has visual and/or audio components. Interactive application module 40 transmits interactive application output data 400 directly to switching module 30. Switching module 30 then designates either television program signal 100 or interactive application output data 400 as primary display signal 300 and transmits primary display signal 300 to display module 70 for presentation. As used herein, presentation of a signal or data means displaying the visual component of a signal or data and outputting the audio component of the signal or data. Displaying a signal or data is merely displaying the visual component of that signal or data.

Display module 70, which can be a television or computer monitor, is capable of presenting images and sounds according to the content of either television program signal 100 or interactive application output data 400. Although not shown in FIG. 1, display module 70 has a display screen for displaying images and a means for outputting sounds, such as speakers. The display screen has primary display area 71 for displaying a primary image. In standard televisions and computer monitors, primary display area 71 is essentially the entire display screen and is the customary area in which a user 50 will view a television program or an interactive application. The primary image displayed in primary display area 71 of display module 70 is the visual component of primary display signal 300 while the sound outputted by display module 70 is the audio component of primary display signal 300. Whether the content of television program signal 100 or the content of interactive application output data 400 is presented by display module 70 depends on whether switching module 30 designates television program signal 100 or interactive application output data 400 as primary display signal 300. When switching module 30 designates television program signal 100 as primary display signal 300, the content of television program signal 100 is presented in primary display area 71 of display module 70. Likewise, when switching module 30 designates interactive application output data 400 as primary display signal 300, the content of interactive application data 400 is presented in primary display area 71 of display module 70.

Figure 2:
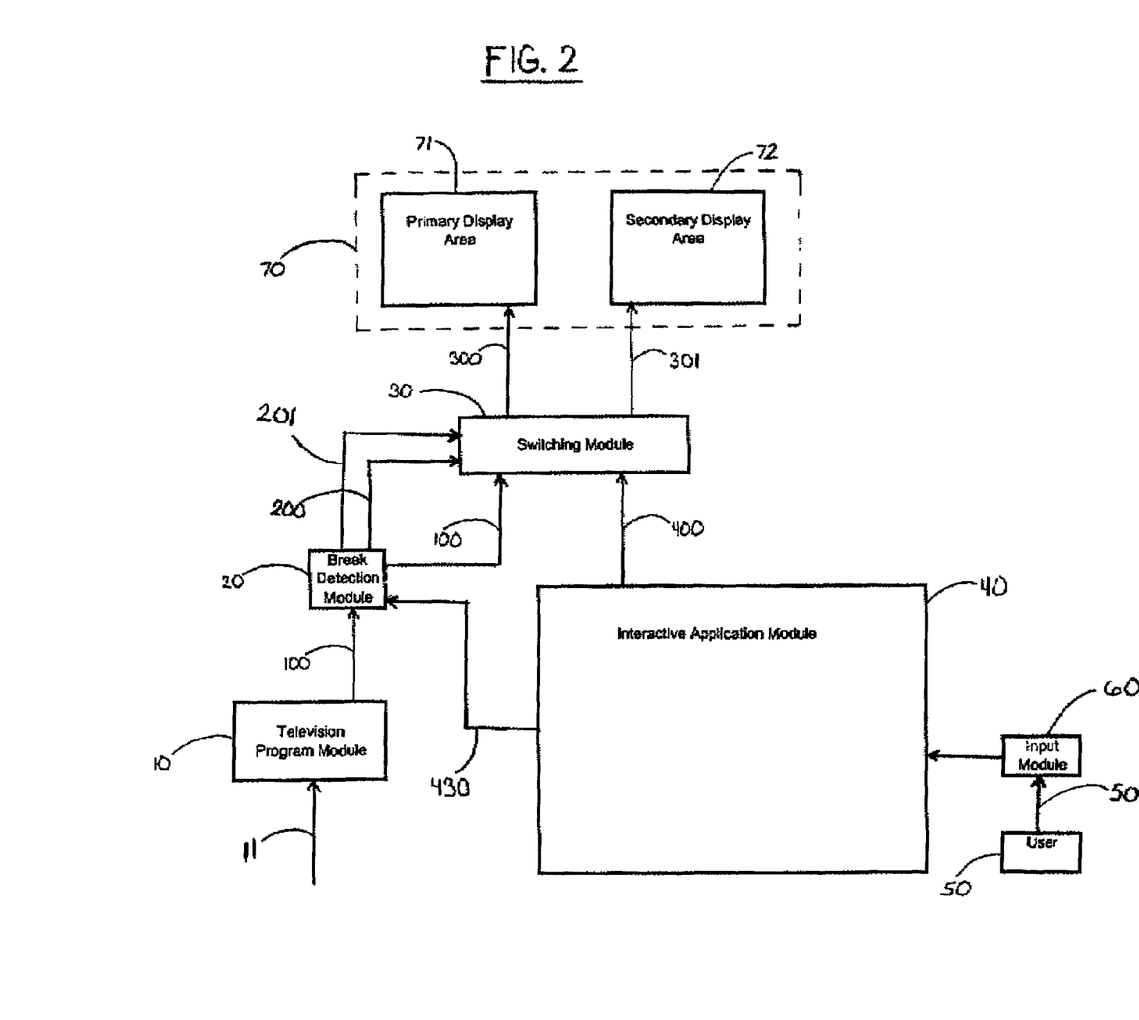
FIG. 2 is a block diagram of an embodiment of a system for detecting and automatically switching to an interactive application during television commercial breaks operating in accordance with the present invention wherein the display module has picture-in-picture capabilities.

Referring to FIG. 2, display module 70 can be a television or computer monitor with picture-in-picture (PIP) capabilities. If display module 70 has PIP capabilities, the display screen (not shown) of display module 70 further comprises a secondary display area 72 for displaying a secondary image in addition to the primary display area 71. In PIP display module 70, the primary display area 71 constitutes a majority of the display screen while the secondary display area 72 constitutes a smaller area of the display screen and is often contained within the primary display area 71. Additionally, when display module 70 has PIP capabilities, switching module 30 is modified so that it is capable of transmitting secondary display signal 301 in addition to primary display signal 300. In this embodiment, switching module 30 designates television program signal 100 and interactive application output data 400 as primary display signal 300 and secondary display signal 301. The determination of how and when switching module 30 designates television program signal 100 and interactive application output data 400 as either the primary display signal 300 or the secondary display signal 301 will be discussed in detail below. Regardless of the designation, switching module 30 transmits primary display signal 300 and secondary display signal 301 to display module 70 so that the content of primary display signal 300 is the primary image presented in primary display area 71 and secondary display signal 301 is the secondary image displayed in secondary display area 72. Moreover, in its default setting the sound outputted by display module 70 is the audio component of primary display signal 300 which is presented in primary display area 71. However, display module 70 can be programmed so that the sound outputted by display module 70 can be the audio component of secondary display signal 301.

Referring back to FIG. 1, television program signal 100 is transmitted to break detection module 20 before being transmitted to switching module 30. While passing through break detection module 20, break detection module 20 monitors the content of television program signal 100 for the beginning and end of commercial breaks.

Television program signal 100 is designated as primary display signal 300 by default. Upon detecting the beginning of a commercial break, break detection module 20 generates break beginning signal 200 and transmits break beginning signal 200 to switching module 30. The internal circuitry of switching module 30 is programmed so that upon receiving break beginning signal 200 from break detection module 20, switching module 30 automatically designates interactive application output data 400 as primary display signal 300. This results in the content of interactive application output data 400 being presented in the primary display area 71 of display module 70. However, if display module 70 has PIP capabilities (as illustrated in FIG. 2), upon receiving break beginning signal 200 from break detection module 20, switching module 30 will also automatically designate television program signal 100 as secondary display signal 301. This results in the content of television program signal 100 being simultaneously displayed in the secondary display area 72 of display module 70 while the content of interactive application output data 400 is presented in the primary display area 71.

Preferably, upon detecting or determining the end of a commercial break, break detection module 20 generates break end signal 201 and transmits break end signal 201 to switching module 30. The internal circuitry of switching module 30 is programmed so that upon receiving break end signal 201 from break detection module 20, switching module 30 automatically designates television program signal 100 as primary display signal 300. Television program signal 100 is designated as primary display signal 300 until switching module 30 receives another break beginning signal 200 from break detection module 20. This results in the content of television program signal 100 being presented in primary display area 71 of display module 70. However, if display module 70 has PIP capabilities (as illustrated in FIG. 2), upon receiving break end signal 201 from break detection module 20, switching module 30 will also automatically designate interactive application output data 400 as secondary display signal 301. This results in the content of interactive application output data 400 being simultaneously displayed in the secondary display area 72 of display module 70 while the content of television program signal 100 is presented in the primary display area 71.

Optionally, break detection module 20 can be programmed so as to not automatically generate break end signal 201 upon detecting or determining the end of a commercial break. Instead, break detection module 20 can be programmed to generate break end signal 201 only when user 50 manually commands break detection module 20 to do so. This command can be entered by user 50 through input module 60. This allows user 50 to operate the interactive application for as long as is desired. When display module 70 has PIP capabilities, this enables user 50 to monitor the content of television program signal 100 in secondary display area 72 while operating the interactive application in primary display area 71, thus enabling user 50 to return the content of television program signal 100 to primary display area 71 only when user 50 so desires.

Figure 6:
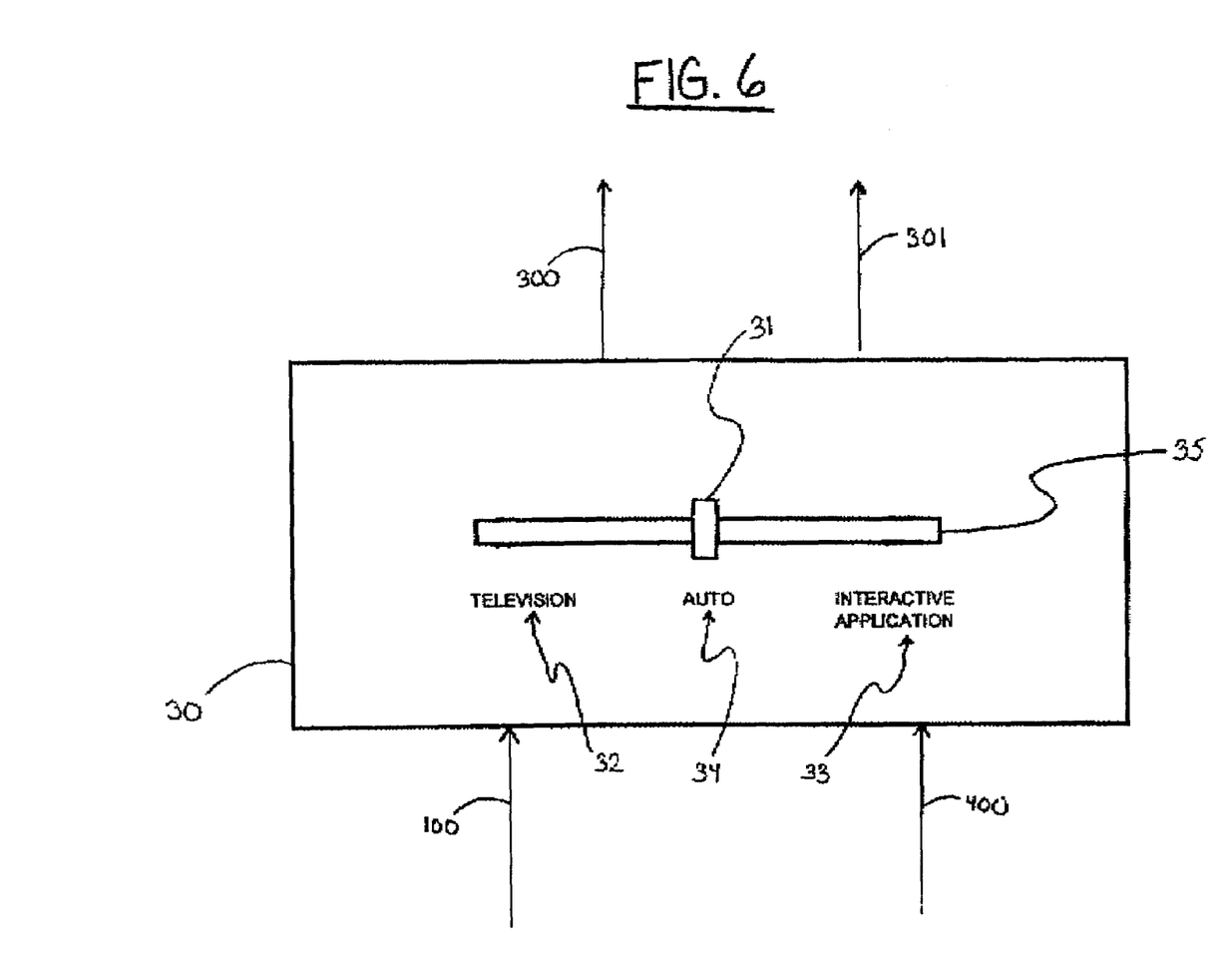
FIG. 6 illustrates an embodiment of a switching module with a means for deactivating the switching module wherein the means for deactivation is a manual switch locating in an "auto" position.

Referring to FIG. 6, the system of the present invention also has a means for deactivating switching module 30, shown in the embodiment of manual switch 31. Manual switch 31 can be slidably moved within switch channel 35 to three different positions: television position 32; interactive application position 33; and auto position 34. When manual switch 31 is in auto position 34, switching module 30 is active. However, when manual switch 31 is moved to television position 32, switching module 30 is deactivated and television program signal 100 is permanently designated as primary display signal 300. If the system has PIP capabilities, moving manual switch 31 to television position 34 also results in interactive application output data 400 being permanently designated as secondary display signal 301. When manual switch 31 is moved to interactive application position 33, switching module 30 is again deactivated and interactive application output data 400 is permanently designated as primary display signal 300. If the system has PIP capabilities, moving manual switch 31 to interactive application position 33 also results in television program signal 100 being permanently designated as secondary display signal 301.

Referring again to FIG. 1, as mentioned above break detection module 20 monitors the content of television program signal 100 for the beginning and end of commercial breaks. The preferred method of detecting the beginning of a commercial break takes advantage of the fact that when the content of television program signal 100 switches to a commercial from an entertainment program, there is a detectable drop in the amplitude of television program signal 100 (i.e. a blanking screen). Break detection module 20 is programmed to constantly monitor the amplitude of television program signal 100 and detect drops in the amplitude. Upon detecting an initial drop in the amplitude of television program signal 100, the internal circuitry of break detection module 20 is programmed to generate and transmit break beginning signal 200 to switching module 30 as discussed above.

In the present invention, the preferred method of detecting or determining the end of commercial breaks takes advantage of the fact that commercials and commercial breaks often last a predictable amount of time depending on time of day, geographical location, and day of the week. Typical commercial break duration times can be reasonably estimated through statistical analysis. In order to take advantage of this fact, break detection module 20 is programmed to have an internal timer that has a default setting or can be set by user 50. The timer is activated and begins to count down upon break detection module 20 detecting the beginning of a commercial break. Upon expiration of the set time, break detection module 20 is programmed to generate break end signal 201. For example, say user 50 programs the timer for two minutes. Upon detecting a commercial break and generating break beginning signal 200, as described above, break detection module 20 activates the timer to start counting down. Upon expiration of the two minutes, break detection module 20 is programmed to generate and transmit break end signal 201 to switching module 30. Moreover, break detection module 20 can be programmed so that the timer can have multiple default settings for different days of the week, different geographical locations, and different times of the day such as morning, afternoon, and evening.

Figure 3:
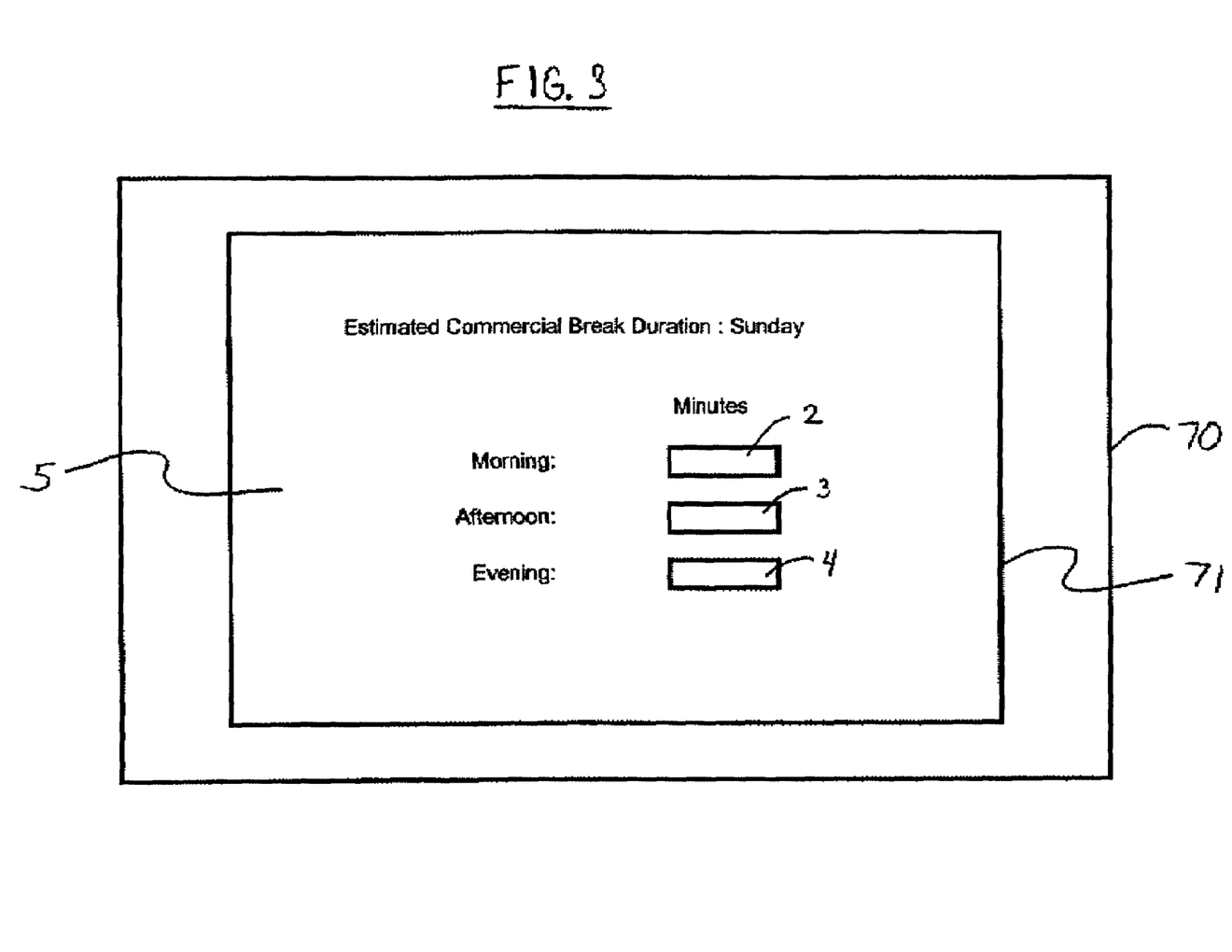
FIG. 3 illustrates an embodiment of a display module displaying a menu for programming the duration a commercial break timer.

Referring now to FIGS. 2 and 3, user 50 can program the timer of break detection module 20 by communicating with interactive application module 40 via input module 60. In response to choices 500 entered by user 50, interactive application module 40 transmits timer programming signals 430 to break detection module 20 to set the timer. In order to facilitate user 50 to be able to set the timer, display menu 5 will appear on display module 70 when user 50 makes such a request via input module 60. User 50 can program the timer by entering time values in corresponding entry boxes 2-4 in the display menu 5 via input module 60. Interactive application module 40 then converts the values entered by user 50 in entry boxes 2-4 into time programming signals 430 and transmits time programming signals 430 to break detection module 20 in order to set the timer accordingly.

Another method in which break detection module 20 can detect the beginning and end of a commercial break is by "spooling" television program signal 100. In this method, break detection module 20 receives television program signal 100 from television program source 10. Upon receiving television program signal 100, break detection module 20 is programmed to digitally record the content of television program signal 100 onto an internal memory (not shown) for a set duration of time before transmitting television program signal 100 to switching module 30. This results in delayed transmission of television program signal 100 to switching module 30. For reasons discussed below, the preferable recording length would be just longer than the approximate length of the longest commercial, which may be for example 1 minute. As discussed earlier, there is a detectable drop in the amplitude of television program signal 100 every time its content switches from an entertainment program to a commercial. Moreover, there is also a drop in amplitude between each commercial and between the final commercial of a commercial break and the return of the entertainment program. Break detection module 20 is programmed to monitor television program signal 100 for these amplitude drops at the beginning of the "spooling" process. When break detection module 20 detects an initial drop in amplitude, break detection module 20 marks that spot of television program signal 100 as it is recorded on the internal memory. Thus, upon transmission of this first marked spot of television program signal 100 to switching module 30 one minute later, break detection module 200 is programmed to generate break beginning signal 200 and simultaneously transmit break beginning signal 200 to switching module 30. This "spooling" method is also used to transmit break end signal 201 by taking advantage of the fact that commercials last a predictable amount of time, such as thirty seconds, forty seconds, or one minute for example. In this embodiment, break detection module 20 analyzes the spacing of the amplitude drops of incoming television program signal 100. Break detection module 20 is programmed so that if the amount of time that passes after a drop in amplitude is detected is greater than a time determined to be sufficiently long enough to indicate that the content of television program signal 100 is not a commercial (for example one minute), then the spot of television program signal 100 where the last drop in amplitude occurred is marked. Upon transmission of this second marked spot to switching module 30 by break detection module 20, break end signal 201 is generated and simultaneously transmitted to switching module 30.

Optionally, break detection module 20 can be programmed to minimize the time in which the "spooling" method results in the content of television program signal 100 being displayed in non-real time (i.e. delayed). In order to achieve this, break detection module 20 is programmed to begin "spooling" television program signal 100 only upon detecting an initial drop in amplitude. Once an initial drop in amplitude is detected, break beginning signal 200 is generated and "spooling" of television program signal 100 begins as described above. Upon generating break end signal 201, according to the method explained above, the internal memory of break detection module 20 can be programmed to drop a couple of frames per second while transmitting spooled television program signal 100 to switching module 30 so that eventually spooled television program signal 100 will be the temporally the same as television program signal 100 as it is generated by television program module 10. At this point, break detection module will stop "spooling" television program signal 100 and transmit television program signal 100 directly to switching module 30. This results in the television program being shown in real time.

Figure 4:
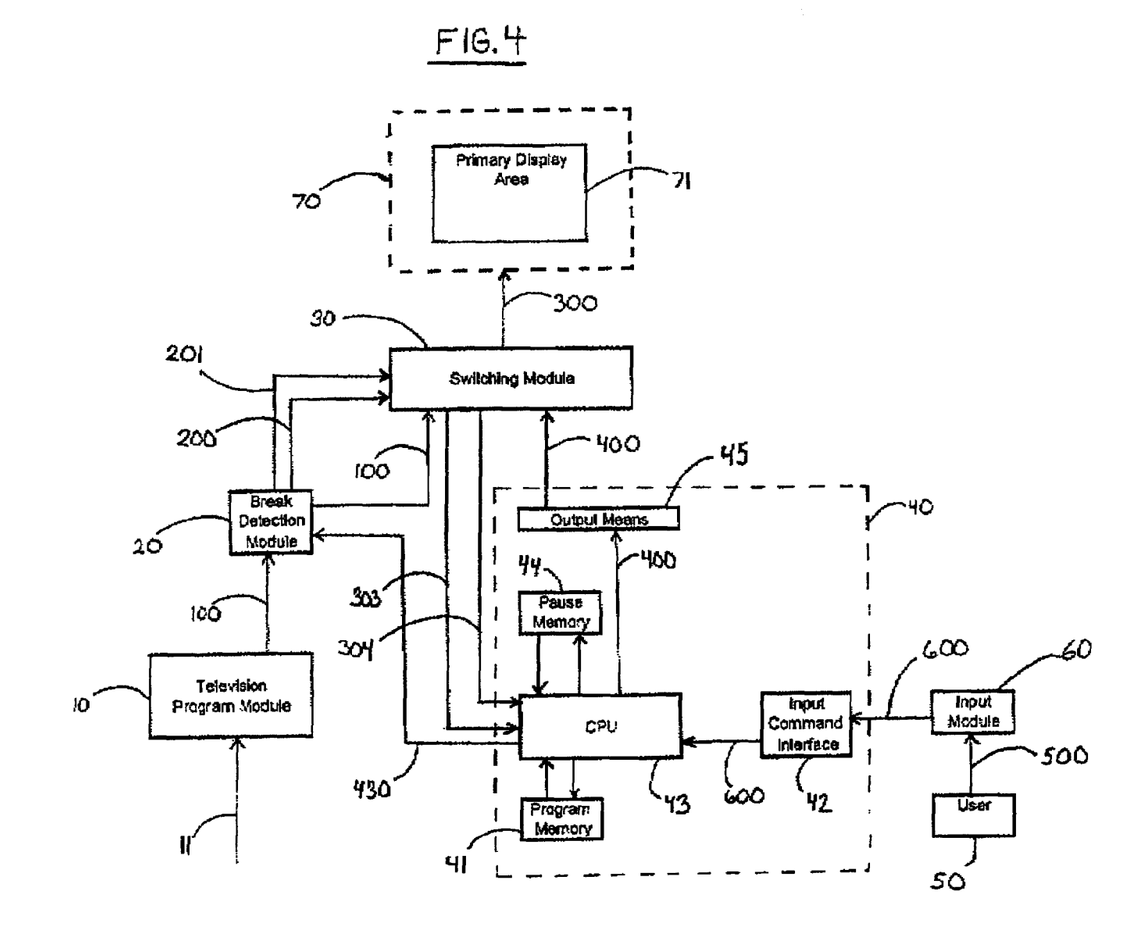
FIG. 4 is a block diagram of an embodiment of a system for detecting and automatically switching to an interactive application during television commercial breaks operating in accordance with the present invention showing an interactive application module in detail.

Referring to FIG. 4, in the illustrated embodiment, user 50 operates the interactive application as it is presented on display module 70 through interactive application module 40. Interactive application module 40 comprises program memory 41, input command interface 42, central processing unit (CPU) 43, pause memory 44, and output means 45. Interactive application module 40 generates interactive application output data 400. Interactive application output data 400 is generated in accordance with the execution of an interactive application program which is stored in program memory 41. Program memory 41 can be an external device such as a CD-ROM or a magnetic disc. Program memory 41 can also be an internal device such as an integrated circuit or a hard drive. The interactive application program contained thereon can be a video game, a word-processor program, a spreadsheet program, or an internet browser program.

Figure 5:
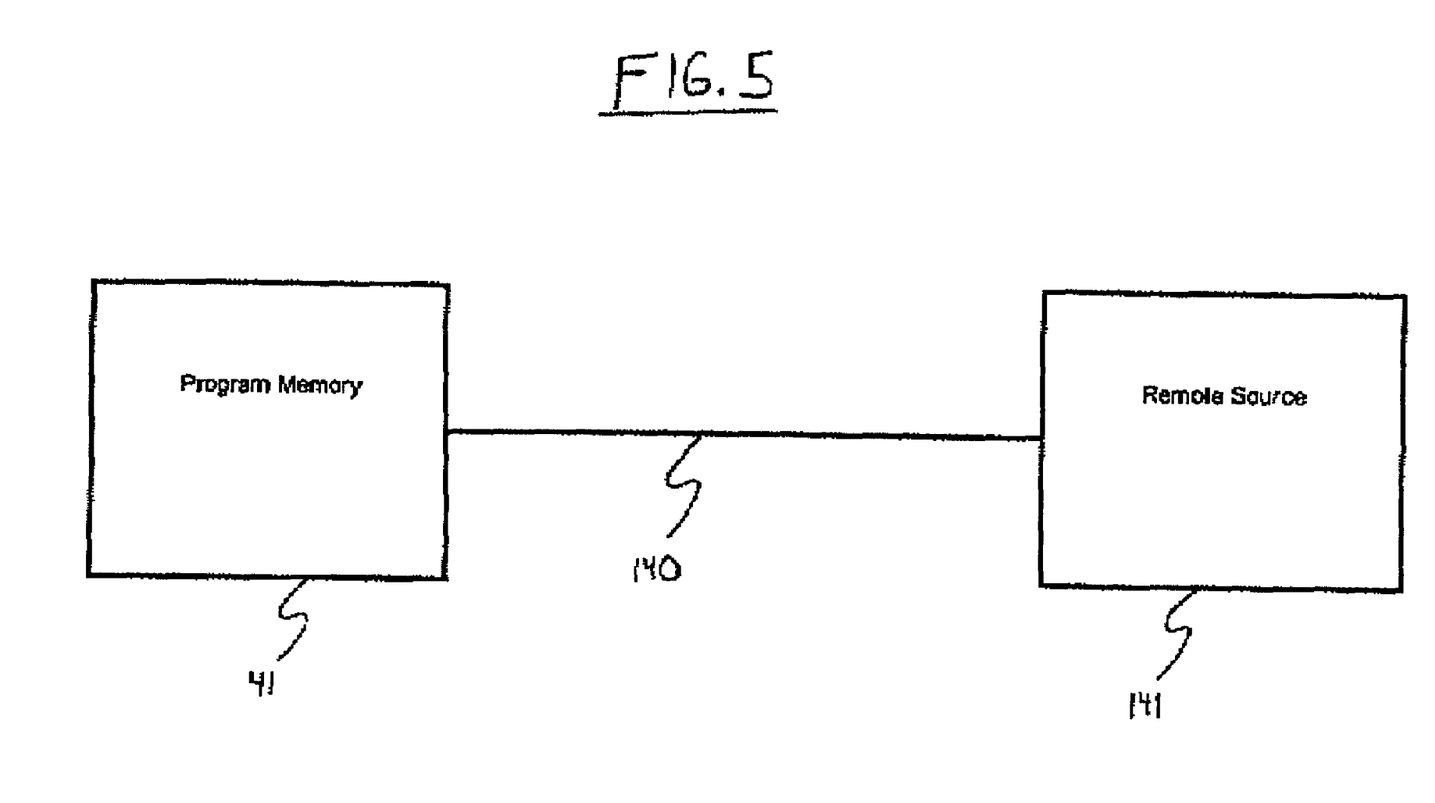
FIG. 5 is a block diagram of an embodiment of a program memory connected to a remote source which stores a multitude of interactive application programs that can be downloaded to and stored in the program memory.

Referring to FIG. 5, in one embodiment program memory 41 can be a local read and write memory that is connected to remote source 141 via download connection 140. In this embodiment, remote source 141 stores a multitude of interactive application programs. Any of the stored interactive application programs contained on remote source 141 can be downloaded to and stored within program memory 41 via download connection 140. Download connection 140 can be an internet connection through either a phone line or a cable line. Remote source 141 can be any computer or server accessible through the internet. If the download connection 140 is a cable internet connection, download connection 141 can either be the same cable connection that delivers television signal 11 to television program module 10 (FIG. 1), or it can be a separate cable connection. The selection and downloading of interactive application programs from remote source 141 is controlled by user 50 entering choices 500 into input module 60 (FIGS. 4 and 5).

Referring to FIG. 4, in order to control the content and generation of interactive application output data 400, user 50 interacts with and controls the execution of the interactive application program by entering choices 500 into input module 60. Input module 60 can be a mouse, a keyboard, or a hand-held controller. User 50 causes input module 60 to generate command signals 600 by entering choices 500 into input module 60 by a variety of methods, including pressing buttons, moving a joystick, or manipulating any type of input sensor on input module 60. Upon choices 500 being entered into input module 60, input module 60 converts choices 500 to command signals 600 and transmits command signals 600 to input command interface 42. Input module 60 communicates command signals 600 to input command interface 42 via an electrical connection or via infrared signals. Where command signals 600 are communicated to input command interface 42 via infrared signal, input command interface 42 is an infrared sensor capable of converting infrared signals to electrical signals.

Upon receiving command signals 600 from input module 60, input command interface 42 transmits command signals 600 to CPU 43. CPU 43 then executes the interactive application program stored in program memory 41 as directed by command signals 600. Execution of the interactive application program results in CPU 43 processing data read from program memory 41 according to command signals 600 and generating corresponding interactive application output data 400. Interactive application output data 400 is transmitted from CPU 43 to output means 45. Output means 45 then transmits interactive application output data 400 to switching module 30. Output means 45 can be any type of port connection capable of completing an electrical connection with switching module 30.

As user 50 continues to enter choices 500 into input module 60, the interactive application program is progressively executed by CPU 43 according to the choices 500 made by user 50. Depending on the embodiment of the interactive application program, progressively executing an interactive application program can mean different things. For example, if the interactive application program is a video game program, progressively executing the video game may consist of user 50 controlling a character within a changing environment, completing consecutive levels, or obtaining a score. If the interactive application is a word processor program, progressively executing the interactive application will consist of writing sentences and progressively adding letters, numbers, or symbols to a worksheet. In both embodiments progressive execution of the interactive application builds on previous choices 500 made by user 50 in executing the interactive application program.

Referring to FIG. 4, in the preferred embodiment of the invention, the progress of user 50 in executing the interactive application program is automatically saved when the content of television program signal 100 replaces the presentation of the content of interactive application output data 400 in primary display area 71. As discussed earlier, this occurs when switching module 30 receives break end signal 201. Upon receiving break end signal 201, switching module generates pause signal 303 and transmits pause signal 303 to CPU 43. Upon receiving pause signal 303, CPU 43 is programmed to automatically store the point of progress in executing the interactive application in pause memory 44. Pause memory 44 is an erasable programmable read only memory (EPROM). As discussed earlier, at the beginning of the next commercial break, interactive application output data 400 will once again be presented in primary display area 71. Upon receiving break beginning signal 200, switching module 30 will designate interactive application output data 400 as primary display signal 300 and simultaneously generate unpause signal 304 and transmit unpause signal 304 to CPU 43. CPU 43 will then read pause memory 44 and resume execution of the interactive application program and will correspondingly generate interactive application output data 400 according to the point of progress saved in pause memory 44. This allows user 50 to execute the interactive application program progressively during consecutive commercial breaks without having to start over. Pause signal 303 and unpause signal 304 can be transmitted to CPU 43 via an electrical connection or via infrared signal. Also, pause signal 303 and unpause signal 304 can alternatively be transmitted to input command interface 42 which would then transmit pause signal 303 and unpause signal 304 to CPU 43.

It should be recognized that many of the signals and data that exist in operating the present invention can be transmitted to the intended device or module directly or indirectly through another device or module that is capable of communicating with the intended device or module. Furthermore, many of the signals, such as pause signal 303 and unpause signal 304, can be generated from an alternate module or device, such as break detection module 20. While the invention has been described and illustrated in detail, various alternatives, modifications, and improvements should become apparent to those skilled in the art without departing from the spirit and scope of the invention.

What is claimed is:

1. A system for automatically switching to an interactive application during a commercial break in video programming comprising: an interactive application module for executing an interactive application program and generating output data; a video program module that generates a video program signal; an input module for entering user input commands into the interactive application module; a break detection module to detect a commercial break in the video program signal and generate a break beginning signal; a display module having a primary display area for receiving the video program signal and the interactive application output data and displaying a primary display image corresponding to either the video program signal or the interactive application output data; and a switching module that switches the primary display image to the interactive application output data upon receiving the break beginning signal so that upon detecting the beginning of a commercial break, the interactive application output data is automatically presented in the primary display area, wherein upon the activation of a second interactive application, said system automatically saves a user's progress in the operation of said interactive program in a memory as to allow the user to use said second interactive application, and restoring said user's progress of said interactive program by accessing said memory to retrieve information corresponding to said user's progress automatically switching back to the display of said video program at the end of said commercial break unless said user enables an override command at the time of said switching operation as to continue the operation of said interactive application until said interactive application is terminated at the time said interactive application is terminated, said system automatically saves said user's progress in the operation of said interactive application as to resume the display of said video program in said primary display area, and received information corresponding to said video program is stored where the video program stored corresponds from the period when said interactive application and said second interactive application is being used after said override command is performed until said interactive applications is terminated, and playing back said stored information in said primary area, when said interactive applications are terminated, as to drop at least one frame of video from said stored information until said video program can be presented in real time only when the operation of said interactive application lasts longer than the period of time corresponding to said beginning of said commercial break and the end of said commercial break.

2. The system of claim 1 wherein the break detection module is further adapted to generate a break end signal either automatically upon detecting or determining the end of a television commercial break or manually upon a viewer's election, wherein the switching module switches the primary display image back to the video program signal upon receiving the break end signal so that the video program signal is presented in the primary display area.

3. The system of claim 2 wherein the interactive application module comprises: a program memory for storing the interactive application program; a central processing unit which executes the interactive application program in accordance to the user input commands; an input command interface for receiving the user input commands from the input module and transferring the user input commands to the central processing unit; said memory for storing a user's point of progress in executing the interactive application program; a data output means for outputting image and sound data in accordance with the execution of the interactive application program.

4. The system of claim 3 wherein a user's point of progress in executing the interactive application program is automatically stored in the memory when the switching module switches the primary display image to the television program signal, wherein execution of the interactive application program is resumed from the user's stored point of progress in the memory when the switching module switches the primary display image back to the interactive application output data.

5. The system of claim 3 wherein the input command interface is an infrared photosensor and the input module is one or more hand held remote controllers which emit infrared signals.

6. The system of claim 3 wherein the program memory is a CD-ROM, magnetic disc, integrated circuit, or hard drive.

7. The system of claim 3 wherein the program memory is a local memory connected to a remote program source that stores a multitude of interactive application programs, wherein the system comprises means to download interactive application programs from the remote program source to the local memory.

8. The system of claim 7 wherein the means to download is connected to the internet.

9. The system of claim 7 wherein the selection and downloading of specific interactive application programs from the remote program source to the internal memory device is controlled by the input commands entered by the user via the input module.

10. The system of claim 1 wherein the video program module is a television receiver, a satellite receiver, a VCR, or an HDD receiver.

11. The system of claim 1 wherein the interactive application program is a video game program, a word processor program, a spreadsheet program, or an internet browser program.

12. The system of claim 1 wherein the input module is a keyboard, mouse, or hand-held controller.

13. The system of claim 1 further comprising means to deactivate the switching module and to manually select either the video program signal or the interactive application output data as the primary display image.

14. The system of claim 1 wherein the display module is a television or a computer monitor having a display screen.

15. The system of claim 14 wherein the primary display area can be the entire display screen of the television or computer monitor or can be an area constituting a majority of the display screen in televisions and computer monitors with picture-in-picture capabilities.

16. The system of claim 1 wherein the display module is a television or computer monitor with picture-in-picture capability having a secondary display area for displaying a secondary display image in addition to the primary display area for presenting the primary display image, wherein the switching module switches the displays of the primary display image and the secondary display image between the television program signal and the interactive application output data so that the television program is presented as the primary display image and the interactive application is displayed as the secondary display image until the beginning of a commercial break is detected, whereupon the detection of the beginning of a commercial break the interactive application output data is presented as the primary display image and the television program signal is displayed as the secondary display image until the end of the commercial break is detected, whereupon the detection of the end of the commercial break the television program signal is presented as the primary display image and the interactive application output data is displayed as the secondary display image.

17. A method of executing an interactive application program during a commercial break comprising the steps of:
providing a video program module which generates a video program signal;
providing an interactive application module to receive user input commands and generate output data according to an interactive application program;
detecting a commercial break in the video program signal;
presenting the video program in a primary display device area of a display until the beginning of the commercial break is detected;
displaying the interactive application in the primary display area until the end of said commercial break, where said video program is automatically resumed to be displayed in said primary display area, except when said user enters in an override command at the time of said commercial break whereby said interactive application is displayed in the primary display area until said interactive application is terminated, wherein
received information corresponding to said video program is stored, where the video program being stored, corresponds from the period when said interactive application is being used after said override command and said storing ends when said interactive application is terminated, and
playing back said stored information in said primary area, when said interactive application is terminated, as to drop at least one frame of video from said stored information until said video program can be presented in real time.

18. The method of claim 17 wherein the interactive application module comprises: a program memory for storing the interactive application program; a central processing unit which executes the interactive application program in accordance to the user input commands; an input command interlace for receiving the user input commands from an input module and transferring the user input commands to the central processing unit; a memory for storing a user's point of progress in executing the interactive application program; a data output means for outputting image and sound data in accordance with the execution of the interactive application program.

19. The method of claim 18 further comprising the step of automatically storing a user's point of progress in executing the interactive application program in the memory when the television program is presented in the primary display area, wherein execution of the interactive application program is resumed from the user's stored point of progress in the pause memory when the interactive application is presented in the primary display area.

20. The method of claim 18 wherein interactive application programs are downloaded to and stored locally in the program memory.

21. The method of claim 17 wherein the display is a television or computer monitor with picture-in-picture capabilities having a secondary display area in addition to a primary display area, wherein the television program is presented in the primary display area and the interactive application displayed in the secondary display area until a commercial break is detected, whereupon detection of the beginning of a commercial break the interactive application is presented in the primary display area and the television program is displayed in the secondary display area until the end of the commercial break is detected, whereupon detection of the end of the commercial break the television program is presented in the primary display area and the interactive application is displayed in the secondary display area.

* * * * *